United States Patent [19]

Dobner

[11] Patent Number: 4,576,417
[45] Date of Patent: Mar. 18, 1986

[54] POWER ASSISTED BRAKING SYSTEM WITH WHEEL LOCK CONTROL

[75] Inventor: Donald J. Dobner, Utica, Mich.

[73] Assignee: General Motors Corporation, Detroit, Mich.

[21] Appl. No.: 697,743

[22] Filed: Feb. 4, 1985

[51] Int. Cl.[4] .......................... B60T 8/44; F15B 7/00; F15B 15/18

[52] U.S. Cl. ............................ 303/15; 60/545; 60/567; 60/581; 60/593; 303/52; 303/100; 303/114; 303/68

[58] Field of Search .............. 303/113, 100, 114–119, 303/61–63, 68–69, 15, 13, 14, 6 A, 6 R, 25–27, 52, 92, 93, 98, 102; 60/593, 567, 581, 545, 550, 554, 547.1, 580, 547.2, 547.3; 188/181, 345; 180/197

[56] References Cited

U.S. PATENT DOCUMENTS

| | | | |
|---|---|---|---|
| 2,124,363 | 7/1938 | Bertrand | 60/580 |
| 2,747,372 | 5/1956 | York | 60/581 |
| 2,953,936 | 9/1960 | Wiley | 60/581 X |
| 3,021,678 | 2/1962 | Pagley | 60/581 |
| 3,524,683 | 8/1970 | Stelzer | 303/117 |
| 3,877,226 | 4/1975 | Blum | 60/545 |
| 4,057,301 | 11/1977 | Foster | 303/114 |
| 4,285,199 | 8/1981 | Leiber | 60/545 |
| 4,351,153 | 9/1982 | Kosmala | 60/593 X |
| 4,395,883 | 8/1983 | Melinat | 60/545 |

Primary Examiner—Douglas C. Butler
Attorney, Agent, or Firm—D. D. McGraw

[57] ABSTRACT

A brake control system in which the master cylinder has two pressurizing chambers for each brake circuit. Three brake circuits are disclosed in detail. One piston of each set of pressurizing chambers is directly applied by brake pedal force. The other piston of each set receives brake pedal force through resilient means, with additional force supplied by suitable servomotors. The servomotors are individually controlled to provide power-assist when appropriate, or to decrease the forces supplied by them to control wheel slip or wheel spin.

4 Claims, 2 Drawing Figures

POWER ASSISTED BRAKING SYSTEM WITH WHEEL LOCK CONTROL

The invention relates to a power assisted braking system in which a plurality of brake circuits, for example a circuit to the left front vehicle brake, another circuit to the right front vehicle brake, and a third circuit to the rear brakes of a vehicle, are pressurized in part by force exerted by the vehicle operator manually and power assist is provided by a power servomotor for each circuit. The power servomotors are under the control of a signal generating controller which individually controls each of the servomotors in response to signals received from signal generators including wheel speed sensors at each of the vehicle wheels, a force sensor generating a signal responsive to the amount of vehicle operator force being manually exerted during the braking operation, and a signal generator such as an accelerometer generating a signal responsive to and indicating the effectiveness of the braking action on the vehicle.

More particularly, the system embodying the invention includes a master cylinder arrangement in which pairs of brake fluid pressurizing chambers are provided, there being one such pair for each brake pressurizing circuit leading to the vehicle wheel brakes as above described. In each pair of brake fluid pressurizing cylinders, there is a primary brake pressurizing chamber and a secondary brake pressurizing chamber, each primary and secondary pressurizing chamber of a pair having an outlet connected to a common outlet which is in turn connected to one of the brake fluid conduits leading to one or more of the vehicle wheel brakes. One brake pressurizing chamber of each of the pairs of chambers has a cross-section area different from the cross-section area of the other brake pressurizing chamber of that pair of chambers. In the preferred embodiment illustrated, the primary pressurizing chamber has a smaller cross-section area than does the second pressurizing chamber of each pair of chambers. In the preferred embodiment illustrated, each of the primary pressurizing chambers of each pair has the same cross-section area as the other primary pressurizing chambers, and the secondary pressurizing chambers similarly have the same respective cross-section areas. However, it may be in some instances desirable to have a pair of chambers with different cross-section areas as compared to one or more of the other pairs of chambers. In the preferred embodiment, the primary pressurizing pistons are actuated by force generated manually by the vehicle operator and transmitted thereto from a brake pedal input member to the primary pressurizing pistons through a suitable push rod arrangement. The secondary pressurizing pistons are also arranged to receive manual force from the brake pedal input member through a push rod arrangement, with a suitable resilient yieldable means therein between the brake pedal input member and each of the secondary pressurizing pistons. Such a resilient yieldable means may be a compression coil spring, by way of example. Each secondary pressurizing piston is also connected by a suitable push rod arrangement to be moved by a power servomotor in either the pressurizing direction or the release direction, or to be held in some position ranging from full pressure release to full pressure generation. In the preferred embodiment illustrated and further described, each of the power servomotors is an electrically powered motor which receives control signals from a controller generating such signals in response to the above noted signals reflecting wheel speeds, vehicle acceleration (positive, neutral, or negative) and manual braking force being applied by the vehicle operator. It is recognized that other suitable signals may be received by the controller, such as the pressures actually being generated in each of the brake fluid circuits.

When the vehicle operator initiates brake actuation by exerting a force on the brake pedal input member, that force is sensed and a signal representing the force is delivered to the controller. At the same time the controller is receiving signals representing wheel speeds of each of the vehicle wheels as well as vehicle acceleration characteristics. The force exerted by the vehicle operator on the brake pedal input member is transmitted through the push rod arrangement to each of the primary pressurizing pistons as well as to each of the secondary pressurizing pistons. Brake actuating pressures are therefore generated in each of the pairs of chambers and are transmitted to each of the brake fluid conduit circuits to the vehicle wheel brakes, applying the vehicle wheel brakes and beginning the braking process so as to decelerate the vehicle. At the same time the controller generates control signals leading to the servomotors connected to the secondary pressurizing pistons and actuates those servomotors to exert a power assisting force on each of the pressurizing pistons to further increase the brake actuating pressures being delivered to the vehicle wheel brakes, in accordance with the amount of force being exerted on the brake pedal input member by the vehicle operator so that the vehicle operator is in control of the brake actuating pressures being delivered to the wheel brakes but does not have to physically and manually generate and apply all of the force necessary to generate such brake actuating pressures.

Should the wheel speed sensor at one of the wheels indicate that one of the wheels is decelerating at a faster rate than the other wheels and at a faster rate in comparison to the amount of vehicle deceleration being obtained, therefore indicating incipient wheel lock, the controller generates a signal and transmits it over the appropriate control line to the appropriate power servomotor to modify the brake actuating pressure being delivered to the appropriate brake fluid conduit circuit by moving the secondary pressurizing piston in the brake releasing direction, accomplishing a decrease in the brake actuating pressure at the outlet for that particular pair of brake pressurizing chambers, thus decreasing the brake apply pressure at the vehicle wheel brake or brakes connected to the circuit pressurized by that pair of chambers, and providing for continuous control of wheel slip so as to achieve a smooth braking action with little wheel speed transient. The feedback gains of the controller are continuously adjusted to achieve consistent braking performance.

The controller may also generate signals during vehicle acceleration in which wheel spin occurs on one or more of the driving wheels so as to apply brake actuating pressure to the wheel brake of the spinning wheel, decreasing wheel spin loss and maintaining better vehicle wheel-to-road traction.

IN THE DRAWING

Figure 1:
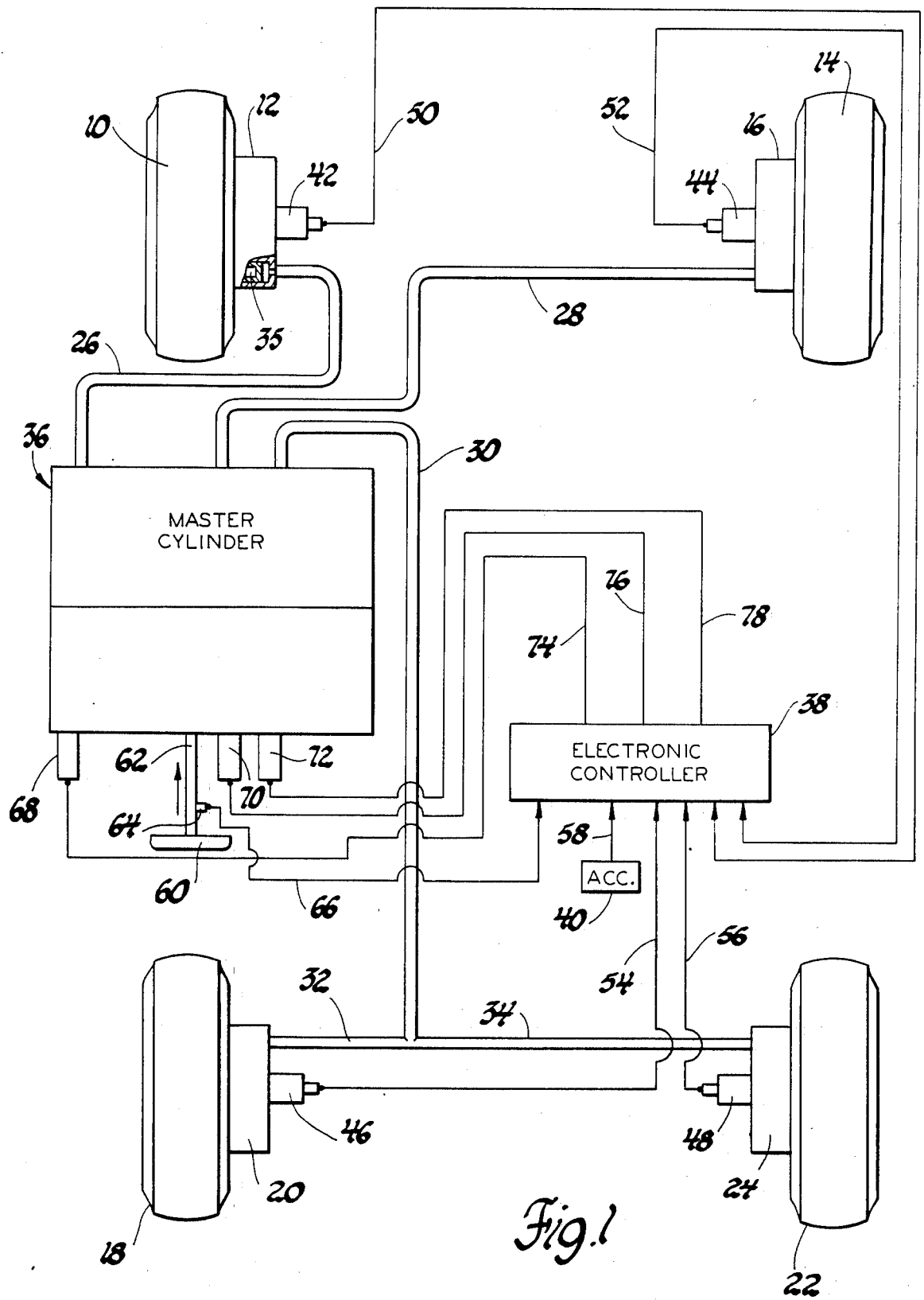
FIG. 1 is a schematic representation of a vehicle having a braking system embodying the invention.

The vehicle in which the system is schematically illustrated as being installed includes a left front wheel 10 with a left front wheel brake 12, a right front wheel 14 with a right front wheel brake 16, a left rear wheel 18 with a left rear wheel brake 20, and a right rear wheel 22 with a right rear wheel brake 24. A brake circuit including brake fluid conduit 26 is connected to the left front wheel brake 12 to provide brake actuating fluid to the left front wheel brake when the brake system is actuated. Similarly, a brake circuit is provided by conduit 28 for the right front wheel brake 16, and conduit 30 is a part of a brake fluid circuit connected to the left and right wheel brakes 20 and 24 through branches 32 and 34, respectively, of conduit 30. Each wheel brake has one or more wheel cylinder pistons on which the brake actuating pressure acts. One such piston 35 is schematically illustrated as a part of left front wheel brake 12.

The system embodying the invention includes the master cylinder assembly 36 to which conduits 26, 28 and 30 are connected, a controller 38, an accelerometer 40, and wheel speed sensors 42, 44, 46, and 48 respectively arranged to sense the speeds of the left front wheel 10, the right front wheel 14, the left rear wheel 18 and the right rear wheel 22. Signal lines 50, 52, 54 and 56 respectively connect wheel speed sensors 42, 44, 46 and 48 with the controller 38 and transmit wheel speed signals generated by the sensors to that controller. Signal line 58 transmits signals generated by the accelerometer 40 to the controller 38, such signals being reflective of the vehicle accelerative condition, whether that condition be zero acceleration, positive acceleration, or negative acceleration (often referred to as deceleration).

The brake pedal 60 has a push rod 62 for actuating the master cylinder 36, and a force sensor 64 is associated with the brake pedal and push rod so as to sense the amount of force being applied by the vehicle operator manually to the master cylinder assembly 36 when the vehicle operator is exerting any brake actuating force on the brake pedal 60. A signal line 66 transmits signals from the force sensor 64 to the controller 38.

As shown in FIG. 1, the master cylinder assembly 36 includes three power servomotors schematically illustrated as electric motors 68, 70 and 72. These motors are illustrated schematically in somewhat greater detail in FIG. 2 to show their connection within the master cylinder assembly 36. Control lines 74, 76 and 78 respectively connect motors 68, 70 and 72 with the controller 38 so that the controller 38 may send control signals to the motor 68, 70 and 72 individually.

Figure 2:
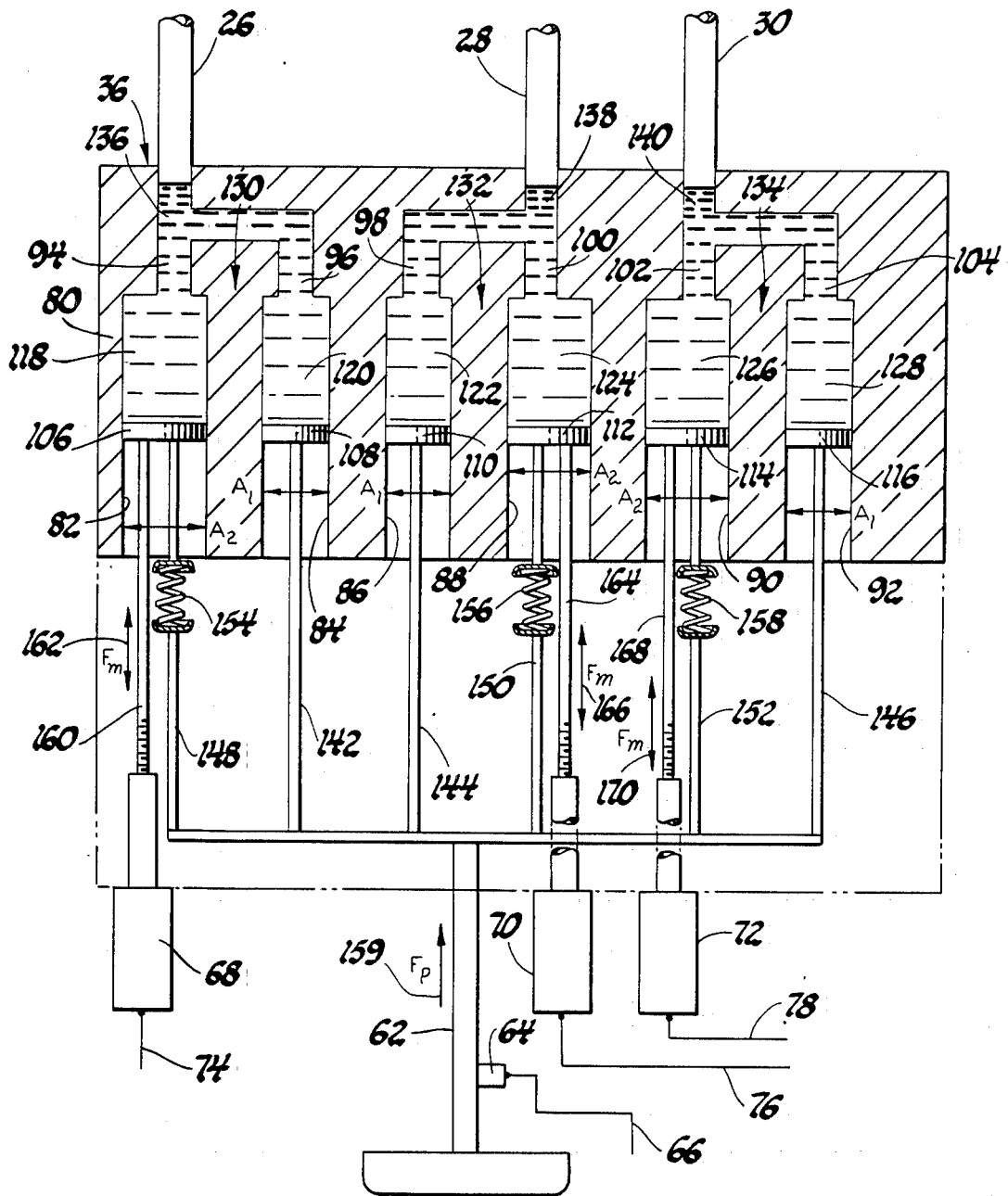
FIG. 2 is a schematic illustration of the master cylinder assembly of the system of FIG. 1, with parts broken away and in section, and includes a schematic representation of the push rod arrangements for the various pressurizing pistons as well as the power servomotors and the brake pedal input member.

Referring now to FIG. 2, which schematically shows the master cylinder assembly 36 in greater detail, the assembly includes a housing 80 having cylinders therein formed in pairs. Thus cylinders 82 and 84 form one pair, cylinders 86 and 88 form another pair, and cylinders 90 and 92 form another pair. These cylinders are respectively provided with brake fluid outlets 94, 96, 98, 100, 102 and 104. Pressurizing pistons 106, 108, 110, 112, 114 and 116 are respectively provided in cylinders 82, 84, 86, 88, 90 and 92 so as to respectively define therewith pressurizing chambers 118, 120, 122, 124, 126 and 128. Outlets 94, 96, 98, 100, 102 and 104 are respectively connected with chambers 118, 120, 122, 124, 126 and 128. It can be seen that chambers 118 and 120 provide a pair 130 of pressurizing chambers, chambers 122 and 124 provide a pair 132 of pressurizing chambers, and chambers 126 and 128 provide a pair 134 of pressurizing chambers. Outlets 94 and 96 of the chamber pair 130 are connected to a single outlet 136 which is connected to brake conduit 26. Outlets 98 and 100 of chamber pair 132 are connected to outlet 138 to which conduit 28 is connected. Similarly, outlet 140 has outlets 102 and 104 connected thereto and is in turn connected to conduit 30. Each of the pressurizing chambers 120, 122 and 128 are primary pressurizing chambers, and each of the pressurizing chambers 118, 124 and 126 are secondary pressurizing chambers. Therefore pressurizing pistons 108, 110 and 116 are primary pressurizing pistons and pressurizing pistons 106, 112 and 114 are secondary pressurizing pistons. Each of the primary pressurizing chambers is illustrated as having a cross-section area indicated by the arrow $A_1$ and each of the secondary pressurizing chambers has a cross-section area indicated by the arrow $A_2$. In the particular embodiment shown in FIG. 2, all of the cross-section areas $A_1$ are the same size and all of the cross-section areas $A_2$ are of the same size, with the areas $A_2$ being larger than the areas $A_1$ in each instance.

The brake pedal push rod 62 is schematically illustrated as being connected to push rods 142, 144 and 146 which are respectively connected to transmit manual forces from the brake pedal 60 and its push rod 62 to the primary pistons 108, 110 and 116. In addition, the brake pedal 160 and push rod 62 are connected through push rods 148, 150 and 152 to the secondary pistons 106, 112 and 114 respectively, through a yieldable means schematically illustrated as coil compression springs 154, 156 and 158 repectively. The manual brake actuating force $F_p$ (which represents the operator's brake force demand) is represented by arrow 159.

Motor 68 is connected by push rod 160 to secondary piston 106 and is capable of exerting a motor generated force $F_m$ in either direction on that piston as illustrated by double-headed arrow 162. Motor 70 is connected to secondary piston 112 by push rod 164 and is capable of exerting a motor generated force $F_m$ in either direction on the piston as indicated by double-headed arrow 166. Motor 72 is connected by push rod 168 to secondary piston 114 and is capable of exerting a motor generated force $F_m$ on that piston through the push rod 168 in either direction as indicated by double-headed arrow 170.

The hydraulic system is composed of the master cylinder assembly 36 and the wheel cylinders and pistons in each of the wheel brakes 12, 16, 20 and 24. Considering the pair of pressurizing chambers 130 and the left front wheel brake connected thereto by way of conduit 26, by way of example, and assuming incompressibility of the brake fluid, the relation between the displacements of the primary cylinder piston 108, the secondary cylinder piston 106, and the wheel cylinder piston 35 in the left front wheel brake 12, is as follows: the cross-section area $A_1$ x the stroke of piston 108 + the cross-section area $A_2$ x the stroke of piston 106 = the cross-section area of the wheel cylinder piston 35 × the stroke of the wheel cylinder piston 35. The wheel brake has an effective characteristic at the wheel cylinder which is comparable to, and may be referred to as, a spring constant, even though it is not absolutely constant but is a function of the travel of the wheel cylinder piston. It is also a function of frictional forces at the wheel cylinder which are considered to be negligible in relation to other brake actuating forces at the wheel cylinder. In the arrangement for pressurizing fluid in chambers 118 and 120, for example, the coupling spring 154 also has a spring constant. It has been found that there is coupling between the dynamics of the primary piston 108 and the secondary piston 106 via (1) friction forces at the wheel cylinder and (2) the coupling spring 154. In practice all of these frictional forces are negligible and the two dynamics can be de-coupled by choosing a matching spring constant for spring 154 so that the driver will not feel the pressure modulation by the motor 68 and neither will the motor dynamics be affected by the vehicle operator's foot pedal force. The relationship of the spring constant of spring 154 to the wheel cylinder spring constant is the cross-section area $A_1 \times$ the cross-section area $A_2 \times$ the wheel cylinder spring constant $\div$ by the cross-section area of the wheel cylinder squared. Even though the wheel cylinder spring constant is not actually constant, the spring constant of spring 154 does not have to match its nonlinearity for an effective de-coupling through the entire working range. It has been found to be sufficient to select a spring constant for spring 154 based on the above noted relationship with an average value for the effective wheel cylinder spring constant. This concept is also applicable to the other pairs of pressurizing chambers and their relationships.

There are two general methods of controlling electric motors such as the electric motors 68, 70 and 72. These methods are current control and voltage control. Using current control, the average armature current is regulated to command value supplied to the motor through its associated control line, resulting in motor torque production linearly proportional to it. Using voltage control, the motor receives a voltage command through its control line, resulting in a motor current. This is the preferred control method.

In the brake system illustrated in the drawings, the motor command voltage that is supplied through the associated control line from the controller 38 is composed of two components. One component is derived from the foot pedal force exerted by the vehicle operator and sensed by sensor 64. The other command voltage component is derived from the signals received by the controller 38 from the wheel speed sensors and the accelerometer. The first component represents the power-assist component and the second one represents the pressure modulation component.

The brake power-assist control is commanded so as to be proportional to the signal generated by the force sensor 64, which senses vehicle operator brake pedal manual input force. It is recognized that power-assist control may be implemented by controlling motor torque. However, unless the inertia of the motor is small relative to that of the secondary piston, most of the generated torque will be used for motor acceleration during braking transients. In order to overcome the motor actuator inertia problem and to achieve a more responsive actuator control, it is considered more desirable to use secondary piston displacement control.

When a braking maneuver is initiated, power-assist control is first generated in the controller 38 to provide the required power assist by appropriately energizing the electric motors 68, 70 and 72. This control mode will remain as long as there is no tendency of impending wheel lock. As soon as an incipient wheel lock situation is detected, the controller 38 will enter the wheel lock control mode.

The system uses a continuous set-point control of the wheel slip for wheel lock control as opposed to the on-off type of control used in many conventional systems. To use this type of control, an optimal wheel slip is first determined and the controller then continuously modulates the brake pressure from each pair of pressurizing chambers to control the wheel speed of each wheel or set of wheels being braked by those pressures to meet the wheel slip requirement. As soon as the wheel slip at a wheel is detected to be larger than the optimum value, the wheel lock control mode starts to operate in the controller 38. During wheel lock control operation, an electric motor actuator may frequently retract its associated secondary piston to reduce the amount of power assist. Under some circumstances, such as a sudden road-surface transition from dry surface to icy surface, the secondary piston has to be momentarily fully retracted even beyond its zero position to prevent wheel lock. This negative position must have a limitation placed thereon so as not to interfere with the primary piston and the foot pedal as well. While a mechanical limit could be provided in the hardware, it is considered more desirable to provide proper actuator control of the electric motors by providing piston position limitation as a part of the control mechanism.

In operation, the system controls the brake actuating pressure of each of the front wheel brakes and jointly controls the brake actuating pressure to the two rear wheel brakes with a select-low logic. That is, a single brake pressure is supplied to the two rear wheel brakes and the control of this pressure is based on the lower one of the wheel speeds for the two wheels with which these brakes are respectively associated. Therefore, the master cylinder 36 is schematically illustrated as a three-chamber design with the two front wheel brakes being controlled independently and the two rear wheel brakes being controlled jointly.

Referring more specifically to FIG. 2, three similar units can be identified, having been described above as pairs of pressure chambers 130, 132 and 134. Each unit has a primary piston and a secondary piston. The vehicle operator's foot pedal force is equally distributed to the three primary pistons and the power assist and pressure modulation forces are supplied to the secondary pistons by servomotors 68, 70 and 72. The brake pressure generated in each circuit by this type of master cylinder is the linear combination of the vehicle operator's foot pedal force acting on the brake pedal 60 and the force generated by the associated servomotor. The brake pressure so generated is delivered to the wheel brake and creates a braking torque through brake lining contact with the associated brake rotor or drum to decelerate the wheel and therefore to decelerate the vehicle. In normal braking operation where there is no incipient wheel lock for any of the vehicle wheels, the system operates in the power-assist brake control mode and the secondary piston of the master cylinder assembly is controlled to generate a pressure component directly proportional to the driver's foot pedal force exerted to obtain the desired amount of braking effort. The amount of brake actuating pressure boost provided in relation to amount of brake actuating pressure generated by the brake pedal input member force is directly proportional to the ratio of the cross-section areas of each of the secondary pressurizing chambers 118, 124 and 126 to the cross-section areas of each of the primary pressurizing chambers, 120, 122 and 128.

In the wheel lock control braking mode, continuous control of wheel slip is used for achieving a smooth braking action with little wheel speed transient. The controller 38 continuously receives signals from the wheel speed sensors, the accelerometer and the brake pedal force sensor during brake actuation. When there is no incipient wheel lock control of any wheel being indicated by the signal so received, the controller controls each of the servomotors 68, 70 and 72 to provide brake actuating pressure boost. When there is incipient wheel lock control sensed at one or more of the vehicle wheels, the controller 38 acts through the appropriate servomotors to provide modification of the brake actuation pressures delivered to the appropriate ones of the wheel brakes by the master cylinder to control wheel lock of the wheels due to excessive brake actuation for the operating conditions at each wheel.

The embodiments of the invention in which an exclusive property or privilege is claimed are defined as follows:

1. For use in a vehicle having front wheels and rear wheels and a wheel brake for braking each of said wheels, a wheel brake actuating and control system comprising:
wheel speed sensors sensing wheel speed of each of said wheels and generating wheel speed signals corresponding to the wheel speeds of said wheels;
a master cylinder for generating wheel brake fluid actuating pressures when actuated and having a brake pedal input member adapted to be moved by the vehicle operator, said master cylinder comprising:
a housing having formed therein a plurality of pairs of brake fluid pressurizing chambers, each of said pairs formed by first and second chambers, each chamber having therein a brake fluid pressurizing piston movable in one direction to increase brake fluid actuating pressures and movable in an opposite direction to decrease brake fluid actuating pressures in said chambers, the first chamber of each of said pairs of chambers having a cross section area different from the cross section area of the second chamber of each of said pairs of chambers;
each of said pairs of chambers having a brake fluid actuating pressure outlet fluid connected to receive brake fluid pressure from said first and second chambers of each of said pairs of chambers, each of said brake fluid actuating pressure outlets being fluid connected to at least one of said wheel brakes so that each of said wheel brakes receives brake fluid actuating pressure from one of said pairs of chambers;
said brake pedal input member being connected to move said brake fluid pressurizing pistons in said first chambers to pressurize brake fluid in said first chambers and said brake fluid actuating pressure outlets;
a servomotor connected to each of said brake fluid pressurizing pistons in said second chambers to independently move said pistons in said second chambers and selectively increase, decrease or maintain the brake fluid actuating pressures in said brake fluid actuating pressure outlets;
means sensing the force exerted on said brake pedal input member by the vehicle operator when said brake pedal input member is urged in the brake actuating direction by force exerted by the vehicle operator, said sensing means generating a vehicle brake force demand signal;
accelerometer means generating a vehicle acceleration signal;
and a controller receiving each of said signals and independently controlling each of said servomotors to provide brake actuating pressure boost and to modify the brake actuating pressures delivered to appropriate ones of said wheel brakes by said master cylinder to control wheel lock of said wheels due to excessive brake actuation for the vehicle operating conditions at each wheel.

2. For use in a vehicle having front wheels and rear wheels and a wheel brake for braking each of said wheels, a wheel brake actuating and control system comprising:
wheel speed sensors sensing wheel speed of each of said wheels and generating wheel speed signals corresponding to the wheel speeds of said wheels;
a master cylinder for generating wheel brake fluid actuating pressures when actuated and having a brake pedal input member adapted to be moved by the vehicle operator, said master cylinder comprising:
a housing having formed therein a plurality of pairs of brake fluid pressurizing chambers, each of said pairs formed by first and second chambers, each chamber having therein a brake fluid pressurizing piston movable in one direction to increase brake fluid actuating pressures and movable in an opposite direction to decrease brake fluid actuating pressures in said chambers, the first chamber of each of said pairs of chambers having a cross section area different from the cross section area of the second chamber of each of said pairs of chambers;
each of said pairs of chambers having a brake fluid actuating pressure outlet fluid connected to receive brake fluid pressure from said first and second chambers of each of said pairs of chambers, each of said brake fluid actuating pressure outlets being fluid connected to at least one of said wheel brakes so that each of said wheel brakes receives brake fluid actuating pressure from one of said pairs of chambers;
said brake pedal input member being connected to move said brake fluid pressurizing pistons in said first chambers to pressurize brake fluid in said first chambers and said brake fluid actuating pressure outlets;
an electric motor connected to each of said brake fluid pressurizing pistons in said second chambers to independently move said pistons in said second chambers and selectively increase, decrease or maintain the brake fluid actuating pressures in said brake fluid actuating pressure outlets;
means sensing the force exerted on said brake pedal input member by the vehicle operator when said brake pedal input member is urged in the brake actuating direction by force exerted by the vehicle operator, said sensing means generating a vehicle brake force demand signal;
accelerometer means generating a vehicle acceleration signal;
and a controller receiving each of said signals and independently controlling each of said electric motors to provide brake actuating pressure boost and to modify the brake actuating pressures delivered to appropriate ones of said wheel brakes by said master cylinder to control wheel lock of said wheels due to excessive brake actuation for the vehicle operating conditions at each wheel, the amount of brake actuating pressure boost provided in relation to the amount of brake actuating pressure generated by brake pedal input member force being directly proportional to the ratio of the cross section area of each second chamber to the cross section area of each first chamber.

3. In a vehicle brake system having a plurality of vehicle wheels to be braked with at least some of said vehicle wheels also to be power driven, said vehicle wheels being subject to possible wheel lock under various braking conditions and said at least some vehicle wheels also being subject to possible wheel spin under certain power driven conditions;

brake pressure circuit means including pressure actuated brakes for said wheels and a plurality of brake pressure circuits each having therein at least one of said brakes;

a brake control system comprising:

master cylinder means selectively generating and varying brake actuating pressures in said brake pressure circuits;

and means sensing certain vehicle and wheel operating conditions and generating first control signals in response to the sensed conditions;

said master cylinder means comprising:

housing means having therein for each of said brake pressure circuits first and second bores, first and second pressurizing pistons respectively received in said first and second bores and cooperating therewith to define first and second brake fluid pressurizing chambers connected to one of said brake pressure circuits, said first and second pressurizing pistons having a predetermined ratio of areas defining movable walls of said pressurizing chambers;

vehicle operator actuated means connected with each of said first pistons and moving said first pistons in said first bores to pressurize brake fluid in said first pressurizing chambers in direct relation to the amount of force operatively applied by the vehicle operator to said vehicle operator actuated means;

resilient means connecting said vehicle operator actuated means and said second pistons and resiliently transmitting force therebetween in direct relation to the amount of force operatively applied by the vehicle operator to said vehicle operator actuated means;

and independently powered power actuating means operatively connected to each of said second pistons to selectively apply a modulated force to said second pistons acting selectively in the brake fluid pressurizing direction or the brake fluid decreasing pressure direction;

said independently powered power actuating means being connected to receive other control signals generated in response to said first control signals;

said power actuating means acting in response to said other control signals so received to vary the brake fluid actuating pressure generated in the pressurizing chamber associated therewith by controlling the direction and amount of force from each of said power actuating means exerted on the second piston associated therewith.

4. In a vehicle brake system having a plurality of vehicle wheels to be braked with at least some of said vehicle wheels also to be power driven, said vehicle wheels being subject to possible wheel lock under various braking conditions and said at least some vehicle wheels also being subject to possible wheel spin under certain power driven conditions;

brake pressure circuit means including pressure actuated brakes for said wheels and a plurality of brake pressure circuits each having therein at least one of said brakes, said brakes having wheel cylinder pistons arranged to be acted upon by brake fluid pressure in said brake pressure circuits across the wheel cylinder piston areas to actuate said brakes;

a brake control system comprising:

master cylinder means selectively generating and varying brake actuating pressures in said brake pressure circuits;

and means sensing certain vehicle and wheel operating conditions and generating first control signals in response to the sensed conditions;

said master cylinder means comprising:

housing means having therein for each of said brake pressure circuits first and second bores, first and second pressurizing pistons respectively received in said first and second bores and cooperating therewith to define first and second brake fluid pressurizing chambers connected to one of said brake pressure circuits, said first and second pressurizing pistons having a predetermined ratio of areas defining movable walls of said pressurizing chambers;

vehicle operator actuated means connected with each of said first pistons and moving said first pistons in said first bores to pressurize brake fluid in said first pressurizing chambers in direct relation to the amount of force operatively applied by the vehicle operator to said vehicle operator actuated means;

resilient means connecting said vehicle operator actuated means and said second pistons and resiliently transmitting force therebetween in direct relation to the amount of force operatively applied by the vehicle operator to said vehicle operator actuated means;

and independently powered power actuating means operatively connected to each of said second pistons to selectively apply a modulated force to said second pistons acting selectively in the brake fluid pressurizing direction or the brake fluid decreasing pressure direction;

said independently powered power actuating means being connected to receive other control signals generated in response to said first control signals;

said power actuating means acting in response to said other control signals so received to vary the brake fluid actuating pressure generated in the pressurizing chamber associated therewith by controlling the direction and amount of force from each of said power actuating means exerted on the second piston associated therewith;

said pressure actuated brakes each having a first characteristic comparable to a spring constant and having an average characteristic value over the braking operating range of the brake system, said resilient means for each of said brake pressure circuits having a second characteristic which is a spring constant, the value of said second characteristic being determined by a direct relationship to said first characteristic average value, said direct relationship being the product of the effective areas of said first and second pistons of each of said brake pressure circuits divided by the square of the effective area of the wheel brake piston of each of said brake pressure circuits.

* * * * *